US010332358B1

(12) United States Patent
Burks et al.

(10) Patent No.: US 10,332,358 B1
(45) Date of Patent: Jun. 25, 2019

(54) SYSTEMS AND METHODS FOR DISTRIBUTED CURRENCY MANAGEMENT

(71) Applicant: UNITED SERVICES AUTOMOBILE ASSOCIATION (USAA), San Antonio, TX (US)

(72) Inventors: Rickey D. Burks, Boerne, TX (US); Charles L. Oakes, III, Boerne, TX (US); Bradly J. Billman, Celina, TX (US); Matthew C. Reedy, San Antonio, TX (US); Anthony G. Castiglione, San Antonio, TX (US); Jess W. Gingrich, San Antonio, TX (US); Samuel Wilson, San Antonio, TX (US); Wayne Maurice Hartman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 436 days.

(21) Appl. No.: 15/046,051

(22) Filed: Feb. 17, 2016

Related U.S. Application Data

(63) Continuation-in-part of application No. 14/824,478, filed on Aug. 12, 2015, which is a continuation of application No. 14/823,020, filed on Aug. 11, 2015, which is a continuation of application No. 14/687,772, filed on Apr. 15, 2015, now abandoned.

(60) Provisional application No. 61/979,968, filed on Apr. 15, 2014, provisional application No. 62/011,182, filed on Jun. 12, 2014.

(51) Int. Cl.
*G06Q 20/40* (2012.01)
*G07F 19/00* (2006.01)
*G06K 19/06* (2006.01)
*G06Q 20/10* (2012.01)
*G01C 21/34* (2006.01)

(52) U.S. Cl.
CPC ........... *G07F 19/203* (2013.01); *G01C 21/34* (2013.01); *G06K 19/06037* (2013.01); *G06Q 20/1085* (2013.01); *G06Q 20/401* (2013.01)

(58) Field of Classification Search
CPC ........ G06Q 40/00–40/08; G07F 19/00–19/207
See application file for complete search history.

(56) References Cited

U.S. PATENT DOCUMENTS

| | | |
|---|---|---|
| 5,386,104 A | 1/1995 | Sime |
| 5,764,789 A | 6/1998 | Pare, Jr. |
| 5,926,463 A | 7/1999 | Ahearn et al. |
| 5,984,178 A | 11/1999 | Gill |
| 6,045,039 A | 4/2000 | Stinson |
| 6,154,879 A | 11/2000 | Pare, Jr. |
| 6,279,826 B1 | 8/2001 | Gill |
| 6,286,756 B1 | 9/2001 | Stinson |

(Continued)

*Primary Examiner* — Narayanswamy Subramanian
(74) *Attorney, Agent, or Firm* — Baker & Hostetler LLP

(57) ABSTRACT

This application relates to methods and systems for managing and distributing currency. One system includes modularized components and interacts with a user via the user's cell phone. The user may authenticate to the system via a password and biometrics, pre-stage interactions such as deposits or withdrawals, and then conduct a transaction. The system may also analyze the documents, such as currency and/or checks, that are deposited with the system, and determine whether they are valid.

29 Claims, 5 Drawing Sheets

(56) References Cited

U.S. PATENT DOCUMENTS

| | | | |
|---|---|---|---|
| 6,317,649 B1 * | 11/2001 | Tedesco | G06Q 20/387 |
| | | | 235/381 |
| 6,427,998 B1 | 8/2002 | Norrie | |
| 6,484,936 B1 | 11/2002 | Nicoll | |
| 6,490,443 B1 | 12/2002 | Freeny, Jr. | |
| 6,554,184 B1 | 4/2003 | Amos | |
| 6,604,680 B2 | 8/2003 | Hamaguchi | |
| 6,695,204 B1 | 2/2004 | Stinson | |
| 6,749,111 B2 | 6/2004 | Graef | |
| 6,768,975 B1 | 7/2004 | Gill | |
| 6,793,134 B2 | 9/2004 | Clark | |
| 6,796,490 B1 | 9/2004 | Drummond | |
| 6,898,299 B1 | 5/2005 | Brooks | |
| 6,953,150 B2 | 10/2005 | Shepley | |
| 7,025,256 B1 | 4/2006 | Drummond | |
| 7,028,887 B2 | 4/2006 | Chigira | |
| 7,036,048 B1 | 4/2006 | Gill | |
| 7,040,533 B1 | 5/2006 | Ramachandran | |
| 7,104,441 B2 | 9/2006 | Shepley | |
| 7,150,393 B1 | 12/2006 | Drummond | |
| 7,175,073 B2 | 2/2007 | Kelley | |
| 7,201,313 B1 | 4/2007 | Ramachandran | |
| 7,216,800 B1 | 5/2007 | Ramachandran | |
| 7,269,737 B2 | 9/2007 | Robinson | |
| 7,316,349 B2 | 1/2008 | Shepley | |
| 7,334,723 B2 | 2/2008 | Shepley | |
| 7,350,230 B2 | 3/2008 | Forrest | |
| 7,366,646 B1 | 4/2008 | Gill | |
| 7,367,492 B2 | 5/2008 | Shepley | |
| 7,389,914 B1 | 6/2008 | Enright | |
| 7,392,938 B1 | 7/2008 | Ramachandran | |
| 7,401,264 B1 | 7/2008 | Gill | |
| 7,404,515 B1 | 7/2008 | Shepley | |
| 7,406,630 B1 | 7/2008 | Gill | |
| 7,418,427 B1 | 8/2008 | Drummond | |
| 7,445,144 B2 | 11/2008 | Schlabach | |
| 7,445,146 B2 | 11/2008 | Drummond | |
| 7,448,535 B2 | 11/2008 | Force | |
| 7,448,536 B2 | 11/2008 | Vankirk | |
| 7,461,779 B2 | 12/2008 | Ramachandran | |
| 7,490,758 B2 | 2/2009 | Drummond | |
| 7,516,882 B2 | 4/2009 | Cucinotta | |
| 7,516,886 B2 | 4/2009 | Gangi | |
| 7,577,612 B2 | 8/2009 | Waller | |
| 7,604,164 B2 | 10/2009 | Schlabach | |
| 7,606,560 B2 | 10/2009 | Labrou | |
| 7,611,049 B2 | 11/2009 | Drummond | |
| 7,617,971 B2 | 11/2009 | Shepley | |
| 7,624,919 B2 | 12/2009 | Meek | |
| 7,628,325 B2 | 12/2009 | McIntosh | |
| 7,631,802 B1 | 12/2009 | Crews | |
| 7,636,679 B2 | 12/2009 | Song | |
| 7,637,420 B2 | 12/2009 | Haley | |
| 7,641,107 B1 | 1/2010 | Gill | |
| 7,653,600 B2 | 1/2010 | Gustin | |
| 7,661,583 B2 | 2/2010 | Schlabach | |
| 7,668,691 B2 * | 2/2010 | Counts | G01C 21/20 |
| | | | 600/595 |
| 7,686,213 B1 | 3/2010 | Ramachandran | |
| 7,717,327 B2 | 5/2010 | Gomes | |
| 7,717,331 B2 | 5/2010 | Shepley | |
| 7,721,953 B1 | 5/2010 | Shepley | |
| 7,725,393 B2 | 5/2010 | Drummond | |
| 7,726,557 B2 | 6/2010 | Bosch | |
| 7,740,169 B2 | 6/2010 | Schlabach | |
| 7,748,615 B2 | 7/2010 | Vankirk | |
| 7,780,077 B1 | 8/2010 | Warren | |
| 7,813,972 B2 | 10/2010 | Ramos | |
| 7,841,515 B2 | 11/2010 | Cucinotta | |
| 7,861,924 B1 | 1/2011 | Block | |
| 7,866,544 B1 | 1/2011 | Block | |
| 7,874,479 B2 | 1/2011 | Drummond | |
| 7,922,076 B2 | 4/2011 | Ryan | |
| 7,926,712 B2 | 4/2011 | Schlabach | |
| 7,926,717 B2 | 4/2011 | McIntosh | |
| 7,946,474 B1 | 5/2011 | Agrawal | |
| 7,946,477 B1 | 5/2011 | Ramachandran | |
| 7,946,480 B2 | 5/2011 | Miller | |
| 7,950,574 B1 | 5/2011 | Ramachandran | |
| 7,954,703 B2 | 6/2011 | Miller | |
| 7,959,067 B2 | 6/2011 | Mateen | |
| 7,975,910 B2 | 7/2011 | Artino | |
| 7,984,847 B1 | 7/2011 | Knouff | |
| 7,992,776 B1 | 8/2011 | Ramachandran | |
| 7,992,777 B1 | 8/2011 | Block | |
| 7,992,778 B1 | 8/2011 | Ramachandran | |
| 8,011,575 B1 | 9/2011 | Ramachandran | |
| 8,015,455 B1 | 9/2011 | Vannatter | |
| 8,020,760 B2 | 9/2011 | Drummond | |
| 8,033,456 B2 | 10/2011 | Drummond | |
| 8,042,733 B2 | 10/2011 | Smith | |
| 8,042,734 B2 | 10/2011 | Drummond | |
| 8,052,050 B2 | 11/2011 | Drummond | |
| 8,070,055 B2 | 12/2011 | Block | |
| 8,083,131 B2 | 12/2011 | Blackford | |
| 8,123,122 B2 | 2/2012 | Shepley | |
| 8,146,802 B1 | 4/2012 | Ramachandran | |
| 8,146,803 B1 | 4/2012 | Ramachandran | |
| 8,150,772 B2 | 4/2012 | Mardikar | |
| 8,152,055 B2 | 4/2012 | Miller | |
| 8,161,330 B1 | 4/2012 | Vannatter | |
| 8,162,207 B2 | 4/2012 | Bosch | |
| 8,172,130 B2 | 5/2012 | Drummond | |
| 8,172,134 B1 | 5/2012 | Ramachandran | |
| 8,172,136 B2 | 5/2012 | Drummond | |
| 8,181,853 B2 | 5/2012 | Crews | |
| 8,186,576 B2 | 5/2012 | Drummond | |
| 8,186,578 B1 | 5/2012 | Block | |
| 8,191,767 B2 | 6/2012 | Ramachandran | |
| 8,191,768 B1 | 6/2012 | Ryan | |
| 8,204,829 B2 | 6/2012 | Alvarez et al. | |
| 8,205,792 B2 | 6/2012 | Drummond | |
| 8,214,290 B1 | 7/2012 | Vannatter | |
| 8,225,989 B1 | 7/2012 | Turocy | |
| 8,229,816 B1 | 7/2012 | Mattison | |
| 8,231,049 B2 | 7/2012 | Agrawal | |
| 8,235,283 B2 | 8/2012 | Meek | |
| 8,240,555 B1 | 8/2012 | Turocy | |
| 8,240,556 B2 | 8/2012 | Drummond | |
| 8,245,913 B1 | 8/2012 | Ramachandran | |
| 8,245,914 B1 | 8/2012 | Ramachandran | |
| 8,245,915 B1 | 8/2012 | Ramachandran | |
| 8,245,917 B1 | 8/2012 | Ryan | |
| 8,281,989 B2 | 10/2012 | Drummond | |
| 8,313,020 B2 | 11/2012 | Ramachandran | |
| 8,328,086 B2 | 12/2012 | Drummond | |
| 8,332,320 B2 | 12/2012 | Singh | |
| 8,336,766 B1 | 12/2012 | Miller | |
| 8,336,769 B2 | 12/2012 | Meek | |
| 8,342,397 B1 | 1/2013 | Ramachandran | |
| 8,345,931 B2 | 1/2013 | Jeronimus | |
| 8,353,450 B2 | 1/2013 | Miller | |
| 8,376,221 B1 | 2/2013 | Ramachandran | |
| 8,381,970 B2 | 2/2013 | Meek | |
| 8,397,108 B1 | 3/2013 | Vannatter | |
| 8,424,755 B1 | 4/2013 | Irudayam | |
| 8,430,306 B2 | 4/2013 | Meek | |
| 8,430,307 B2 | 4/2013 | Drummond | |
| 8,453,924 B1 | 6/2013 | Turocy | |
| 8,459,546 B1 | 6/2013 | Block | |
| 8,474,707 B2 | 7/2013 | Ramachandran | |
| 8,479,978 B1 | 7/2013 | Miller | |
| 8,479,983 B1 | 7/2013 | Block | |
| 8,490,867 B1 | 7/2013 | Ryan | |
| 8,495,424 B1 | 7/2013 | Vannatter | |
| 8,496,168 B1 | 7/2013 | Miller | |
| 8,505,814 B1 * | 8/2013 | Block | G07F 19/207 |
| | | | 235/379 |
| 8,523,057 B2 | 9/2013 | Drummond | |
| 8,534,547 B2 | 9/2013 | Shepley | |
| 8,540,144 B2 | 9/2013 | Graef | |
| 8,540,145 B1 | 9/2013 | Davis | |
| 8,540,147 B2 | 9/2013 | Block | |
| 8,548,912 B2 | 10/2013 | Cincera | |

(56) References Cited

U.S. PATENT DOCUMENTS

| | | |
|---|---|---|
| 8,549,512 B1 | 10/2013 | Vannatter |
| 8,554,689 B2 | 10/2013 | Mardikar |
| 8,556,168 B1 | 10/2013 | Lewis |
| 8,561,887 B1 | 10/2013 | Kovacs |
| 8,561,889 B2 | 10/2013 | Block |
| 8,573,481 B1 | 11/2013 | Ryan |
| 8,573,484 B1 | 11/2013 | Irudayam |
| 8,590,780 B2 | 11/2013 | Graef |
| 8,590,787 B1 | 11/2013 | Courtright |
| 8,593,971 B1 | 11/2013 | Bryant |
| 8,608,058 B2 | 12/2013 | Drummond |
| 8,632,000 B2 | 1/2014 | Laracey |
| 8,640,946 B1 | 2/2014 | Block |
| 8,640,947 B1 | 2/2014 | Lewis |
| 8,651,373 B1 | 2/2014 | Block |
| 8,657,188 B2 | 2/2014 | Ma |
| 8,701,984 B1 | 4/2014 | Shirah |
| 8,701,985 B2 | 4/2014 | Graef |
| 8,707,163 B2 | 4/2014 | Boudville |
| 8,733,635 B2 | 5/2014 | Miller |
| 8,738,973 B1 | 5/2014 | Vannatter |
| 8,746,551 B2 | 6/2014 | Bryant |
| 8,762,274 B2 | 6/2014 | Bosch |
| 8,763,897 B1 | 7/2014 | Enright |
| 8,781,974 B2 | 7/2014 | Singhal |
| 8,794,514 B2 | 8/2014 | Drummond |
| 8,800,864 B2 | 8/2014 | Graef |
| 8,806,275 B1 | 8/2014 | Vannatter |
| 8,821,277 B2 | 9/2014 | Boudville |
| 8,825,404 B2 | 9/2014 | Mays |
| 8,827,151 B2 | 9/2014 | Agrawal |
| 8,840,016 B1 | 9/2014 | Schott |
| 8,856,042 B2 | 10/2014 | Deguchi |
| 8,870,066 B2 | 10/2014 | Graef |
| 8,893,959 B1 | 11/2014 | Graef |
| 8,910,861 B2 | 12/2014 | Wadia |
| 8,924,266 B2 | 12/2014 | Shirbabadi |
| 8,950,666 B2 | 2/2015 | Meek |
| 8,960,539 B2 | 2/2015 | Turocy |
| 8,978,973 B2 | 3/2015 | Turocy |
| 9,019,066 B2 | 4/2015 | Black |
| 2001/0026632 A1 | 10/2001 | Tamai |
| 2002/0082994 A1 | 6/2002 | Herziger |
| 2002/0161645 A1 | 10/2002 | Walker |
| 2002/0166063 A1 | 11/2002 | Lachman et al. |
| 2003/0139994 A1 | 7/2003 | Jones |
| 2003/0182194 A1 | 9/2003 | Choey |
| 2003/0233278 A1 | 12/2003 | Marshall |
| 2004/0139014 A1 | 7/2004 | Song |
| 2004/0158539 A1 | 8/2004 | Akita |
| 2004/0215566 A1 | 10/2004 | Meurer |
| 2005/0108166 A1 | 5/2005 | Colley |
| 2005/0131821 A1 | 6/2005 | Eberhardt |
| 2006/0068817 A1 | 3/2006 | Black |
| 2006/0100961 A1 | 5/2006 | Paterno |
| 2006/0136739 A1 | 6/2006 | Brock |
| 2006/0136773 A1 | 6/2006 | Kespohl et al. |
| 2006/0242019 A1 | 10/2006 | Walker |
| 2006/0242020 A1 | 10/2006 | Walker |
| 2006/0247852 A1 | 11/2006 | Kortge et al. |
| 2006/0265602 A1 | 11/2006 | Robinson |
| 2007/0143225 A1 | 6/2007 | Hamilton |
| 2007/0156530 A1 | 7/2007 | Schmitt |
| 2007/0198287 A1 | 8/2007 | Outwater |
| 2007/0203835 A1 | 8/2007 | Cai |
| 2007/0271194 A1 | 11/2007 | Walker |
| 2007/0295807 A1 | 12/2007 | Antos |
| 2010/0044430 A1 | 2/2010 | Song |
| 2010/0051686 A1 | 3/2010 | Obi |
| 2010/0114765 A1 | 5/2010 | Gustin |
| 2010/0161343 A1 | 6/2010 | Kennedy |
| 2010/0162030 A1 | 6/2010 | Schindel |
| 2010/0274566 A1* | 10/2010 | Carlson ............... G06Q 30/02 705/1.1 |
| 2011/0016047 A1 | 1/2011 | Wu |
| 2011/0022484 A1 | 1/2011 | Smith |
| 2011/0077999 A1 | 3/2011 | Becker |
| 2011/0087611 A1 | 4/2011 | Chetal |
| 2011/0093389 A1 | 4/2011 | Singhal |
| 2011/0184865 A1 | 7/2011 | Mon |
| 2011/0191243 A1 | 8/2011 | Allen |
| 2011/0238573 A1 | 9/2011 | Varadarajan |
| 2012/0190301 A1 | 7/2012 | Hart |
| 2012/0197797 A1 | 8/2012 | Grigg |
| 2012/0197798 A1 | 8/2012 | Grigg |
| 2012/0226610 A1 | 9/2012 | Gill |
| 2013/0005253 A1 | 1/2013 | Grigg |
| 2013/0046697 A1 | 2/2013 | Schibuk |
| 2013/0073467 A1 | 3/2013 | Underwood |
| 2013/0090850 A1* | 4/2013 | Mays ............... G01C 21/36 701/533 |
| 2013/0124411 A1 | 5/2013 | Kobres |
| 2013/0138568 A1 | 5/2013 | Dittmer |
| 2013/0179316 A1* | 7/2013 | Ross ............... G06Q 40/00 705/35 |
| 2013/0246264 A1 | 9/2013 | Lucas |
| 2013/0262303 A1 | 10/2013 | Metral |
| 2014/0002241 A1 | 1/2014 | Elghazzawi |
| 2014/0032345 A1 | 1/2014 | Moore |
| 2014/0046842 A1 | 2/2014 | Irudayam |
| 2014/0058815 A1 | 2/2014 | Hiremath |
| 2014/0091950 A1 | 4/2014 | Gueziec |
| 2014/0172288 A1 | 6/2014 | Gutman |
| 2014/0172703 A1 | 6/2014 | Black |
| 2014/0188724 A1 | 7/2014 | Dutta |
| 2014/0191028 A1 | 7/2014 | Laracey |
| 2014/0229002 A1 | 8/2014 | Graef |
| 2014/0236797 A1 | 8/2014 | Mintz et al. |
| 2014/0244159 A1* | 8/2014 | Musabji ............... G01C 21/3638 701/428 |
| 2014/0263618 A1* | 9/2014 | McCarthy ............... G06Q 40/02 235/379 |
| 2014/0279490 A1 | 9/2014 | Calman |
| 2014/0324689 A1 | 10/2014 | Pinault |
| 2014/0337221 A1 | 11/2014 | Hoyos |
| 2014/0346007 A1 | 11/2014 | Enright |
| 2014/0358777 A1 | 12/2014 | Gueh |
| 2014/0365365 A1 | 12/2014 | Drummond |
| 2015/0058216 A1 | 2/2015 | Luciani |
| 2015/0066564 A1 | 3/2015 | Neilan |
| 2015/0081559 A1 | 3/2015 | Dua |
| 2015/0088750 A1 | 3/2015 | Dua |
| 2015/0090782 A1 | 4/2015 | Dent |
| 2015/0095235 A1 | 4/2015 | Dua |
| 2015/0100489 A1 | 4/2015 | Graef |
| 2015/0285655 A1 | 10/2015 | Chintakindi et al. |

* cited by examiner

SYSTEMS AND METHODS FOR DISTRIBUTED CURRENCY MANAGEMENT

RELATED APPLICATIONS

This application is a continuation-in-part of U.S. patent application Ser. No. 14/824,478 filed Aug. 12, 2015, and is a continuation of U.S. patent application Ser. No. 14/823,020 filed Aug. 11, 2015, and is a continuation of U.S. patent application Ser. No. 14/687,772, filed Apr. 15, 2015, which claims benefit of provisional U.S. Appl. No. 61/979,968, filed Apr. 15, 2014, and U.S. Appl. No. 62/011,182, filed Jun. 12, 2014.

BACKGROUND

Despite the ubiquity of personal electronics and available electronic data, using Automated Teller Machines (ATMs) remains an antiquated process. Accordingly, there is an unmet need to leverage current and future technical capabilities to improve the efficiency of tasks based on and related to currency distribution.

SUMMARY OF THE INVENTION

Described herein are systems and methods for utilizing financial management modules to extend beyond conventional automated teller machine (ATM) functionality to a more cost effective efficient, and convenient financial services machine. Financial management modules and systems can be utilized to deposit checks, perform security checks, insulate communication paths to prevent direct user/module interaction, and analyze deposited checks and/or currency for counterfeit and/or worn/torn documents. A user's digital information and personal computing device may be used in this system to more accurately meet the explicit and perceived banking desires of the user. Further, the module's power system and other computerized and compartmentalized features allow for a reduced expense to manufacture, install and distribute the modules and systems. In addition to these advantages, the modules and systems can also enhance currency management by voiding checks and currency and eliminating manual intervention in currency distribution.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
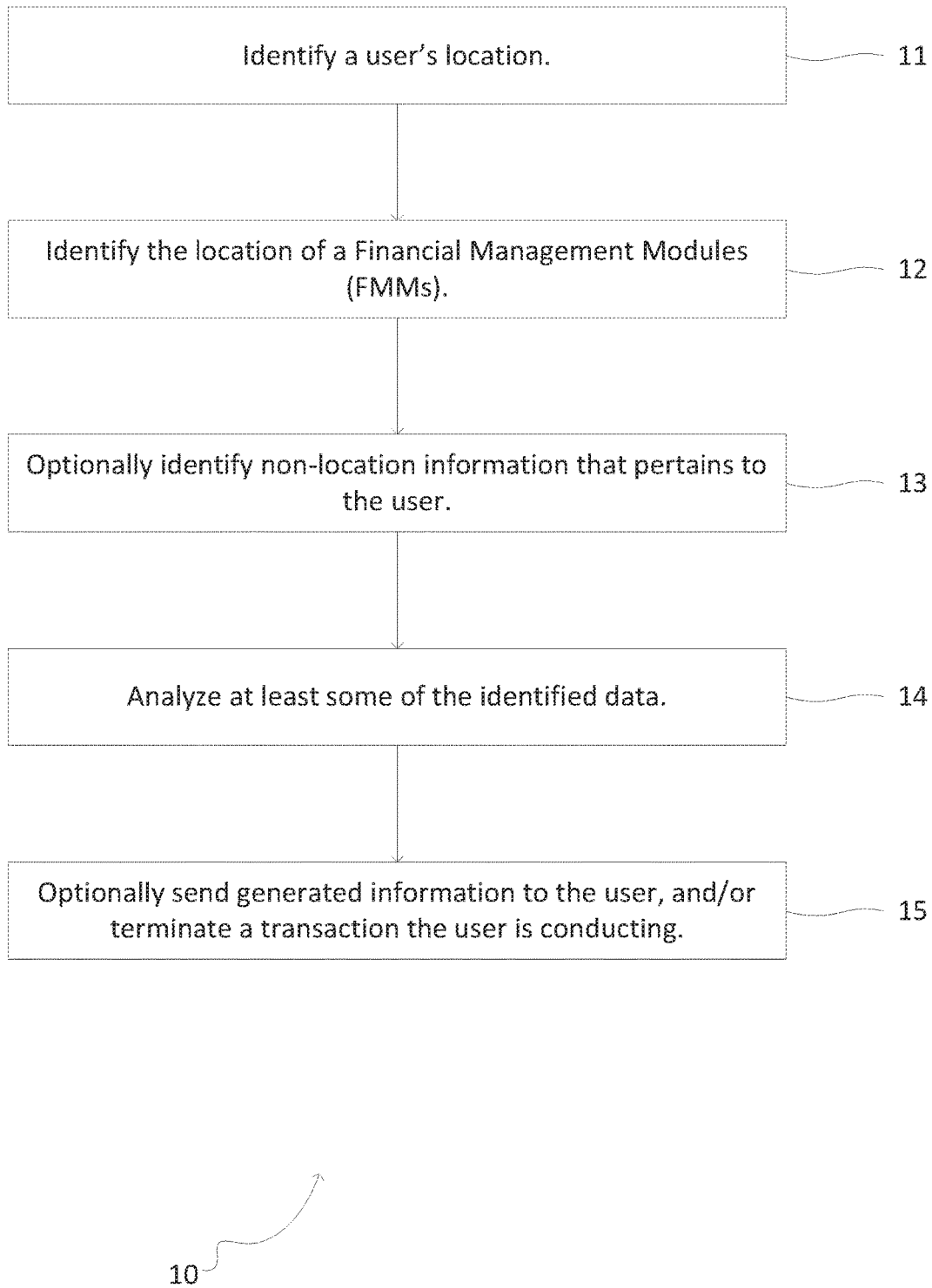
FIG. 1 is a flowchart depicting an illustrative operation of the systems and methods described herein.

The present disclosure is directed to interactive financial management modules, systems, and methods of utilizing the same. It is to be appreciated that various embodiments are described below more fully with reference to the accompanying drawings. The inventions described herein are not limited in any way to the illustrated embodiments as the illustrated embodiments are merely exemplary of the invention, which can be provided in various forms. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor (e.g., embedded processor) of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, any processes described herein may be practiced in any order, and with the addition of or the omission of steps, as would be practicable and recognized by those skilled in the art.

Exemplary Use Case:

Turning to FIG. 1, illustrated therein is an exemplary process 10 of utilizing one or more embodiments described herein. Starting at step 11, a user's location is identified. Then, the location of at least one financial management module (FMM) is identified (step 12), and optionally non-location related information that pertains to the user is identified (step 13). Then, the data is analyzed (step 14), and finally generated information is optionally sent to the user, and/or a transaction being conducting is terminated (step 15).

Referring now to identifying the user's location (step 11), that may be determined, for exemplary purposes only and without limitation, via an electronic device on the user. For example, the location may be based on GPS information associated with and/or executing on at least in part on one of the user's electronic device(s). In another example, the user's location may be determined based on other information, such as the user's detection of WiFi signal(s) that are known and/or suspected to be located at certain location(s). Exchangeable image file format (EXIF) data, meta-data, or image feature recognition associated with pictures posted to the system through social media may also be used to geographically locate a user. Also, the location of one or more FMMs is identified (step 12).

Referring now to identifying non-location information that relates to the user (step 13), such information may include whether the user is conducting a purchase. For example, if the user is located within a store where the user is known and/or suspected to make purchases, it may be inferred that the user is making a purchase and/or may be making a purchase. In another example, the user may be conducting a transaction, such as a purchase and/or an ATM transaction (e.g., withdrawal and/or a deposit). Thus, and as referenced herein, some and/or all of this information may be analyzed to determine, such as by being more probable than a predetermined threshold of confidence, that the user may benefit from certain information(s) being passed to the user (steps 14 and 15).

In one example, if the user is currently conducting a transaction with an ATM and the user moves too far away from the ATM, then the transaction may be terminated. Further, it is contemplated herein that the determination of whether the user is too far from the ATM and/or FMM may be made at any point during the life of a transaction, including without limitation before the transaction is initiated.

One or more embodiments described herein relate to a method of utilizing a currency-management system that comprises a plurality of currency dispensers. The method may include receiving a request for an interaction with a currency dispenser, such as a request to pick up a specified amount of currency at a specified time, and identifying a currency dispenser to perform the interaction. The method may further include sending information that identifies the identified currency dispenser and receiving a currency dispenser selection.

The method may also include receiving an indication of an expected travel route for the user, and the step of identifying the currency dispenser is based at least in part on the expected travel route of the user.

The method may alternatively and/or also include the step of sending a map that identifies the currency dispenser, with the currency dispenser being color-coded in the map, and the color-coding relates to a condition of the currency dispenser (e.g., currency availability, how long it will take to get to it, how long a line is present at the currency dispenser). The method may alternatively and/or also include the step of displaying a map to the user involving displaying a path to the at least one currency dispenser. The method may alternatively and/or also include the step of displaying a map to the user involving displaying a three-dimensional map to the user. The location of the currency dispenser may be automatically loaded into the map, routing service, and/or telematics application of preference to the user. The method may alternatively and/or also include communicating directions to the user to get to the currency dispenser.

The method may alternatively and/or also include displaying an image of the currency dispenser.

The method may alternatively and/or also include the currency dispenser's image having a viewing angle that is similar to an expected viewing angle that the user will approach the currency dispenser from.

The method may alternatively and/or also include the image of the currency dispenser being modified to indicate an incentive, and the method may also involve displaying an image of the currency dispenser. As discussed in further detail herein, the incentive may relate to the user performing a specified action, such as an action to alleviate a deficiency in the distribution of currency within a system of currency dispensers, wherein the benefit of the incentive is accrued to the user upon completion of the action.

The method may alternatively and/or also include each of the currency dispensers in the map being color-coded, with the color-coding relating to a condition of the currency dispenser.

The currency dispenser may also transmit an audible cue to the users which may provide information on the state of the system.

The currency dispenser may also provide a touch point to connect the individual, the individual's smart phone, or wearable technology into a body area network (BAN) whereby information pertinent to the system's active incentive, function, state, or use statistics may be transmitted without broadcasting the signal over the air.

The method may alternatively and/or also include determining a condition of the currency dispenser, and generating, in response to the condition, an incentive to induce a user to perform the interaction with the currency dispenser, with the information that was sent to the user including information identifying the incentive.

The method may alternatively and/or also include receiving information relating to an expected travel route for the user, and where the step of generating the incentive is at least partially based on said route.

The method may alternatively and/or also include the request for an interaction being generated at least partially based on the user's (electronic) calendar.

The method may alternatively and/or also include calculating an expected adjusted amount of currency, in the FMM, that is based on at least the current amount, in the currency dispenser, and also the (planned future) interaction with the user. The method may alternatively and/or also include the currency dispenser sending an indication that the selected currency dispenser has the expected adjusted amount even while the selected currency dispenser still has the current amount.

The method may alternatively and/or also include authenticating the user at least in part based on receiving an image on the currency dispenser from the user's mobile device. The image may be static, dynamic (e.g., a video), and/or include a QR code.

Figure 2:
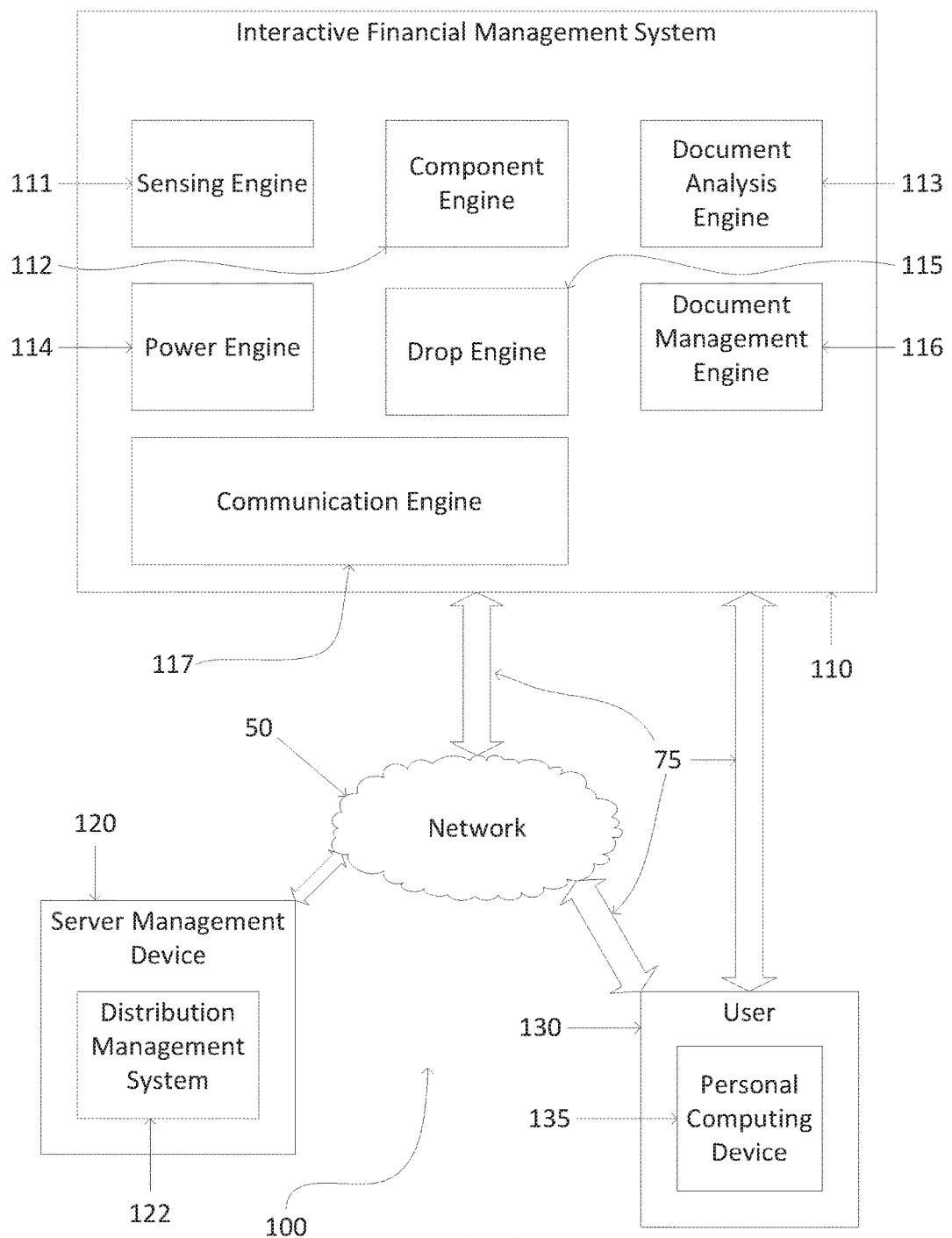
FIG. 2 depicts one embodiment of an interactive financial management system and environment that may be utilized to practice FIG. 1.

Other and/or Similar Use Cases:

Referring to FIG. 2, illustrated therein is a hardware diagram depicting a system 100 in which the processes described herein can be executed is provided for exemplary purposes. In one example, system 100 includes interactive financial management system 110, server management device 120, user 130 (including user's personal computing device 135), network 50 and communications links 75. In one embodiment, interactive financial management system 110 includes sensing engine 111, component engine 112, document analysis engine 113, power engine 114, drop engine 115, and document management engine 116.

Exemplary embodiments of user's personal computing device participant devices 135 include but are not limited to mobile devices, such as a multifunction "smart phones", wearable (e.g., watches, Google Glass®, contact lenses, clothes), personal computers, notebook computers, tablet computers, and/or server devices. It should be understood that devices 135 each generally include at least one processor, at least one data interface, and at least one memory device coupled via buses. Devices 135 may be capable of being coupled together, coupled to peripheral devices, and input/output devices. Devices 135, are represented in the drawings as standalone devices, but are not limited to such. Each can be combined with other devices in a distributed processing environment or divided into subcomponents.

Referring further to FIG. 2, it is to be appreciated that network 50 depicted in FIG. 2 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium.

Computer devices communicate over network 50 through one or more communications links 75. Communication links 75 may comprise either wired or wireless links. It is to be appreciated that the illustrated network connections of FIG. 2 are exemplary and other means of establishing a communications link between multiple devices may be used.

Figure 3:
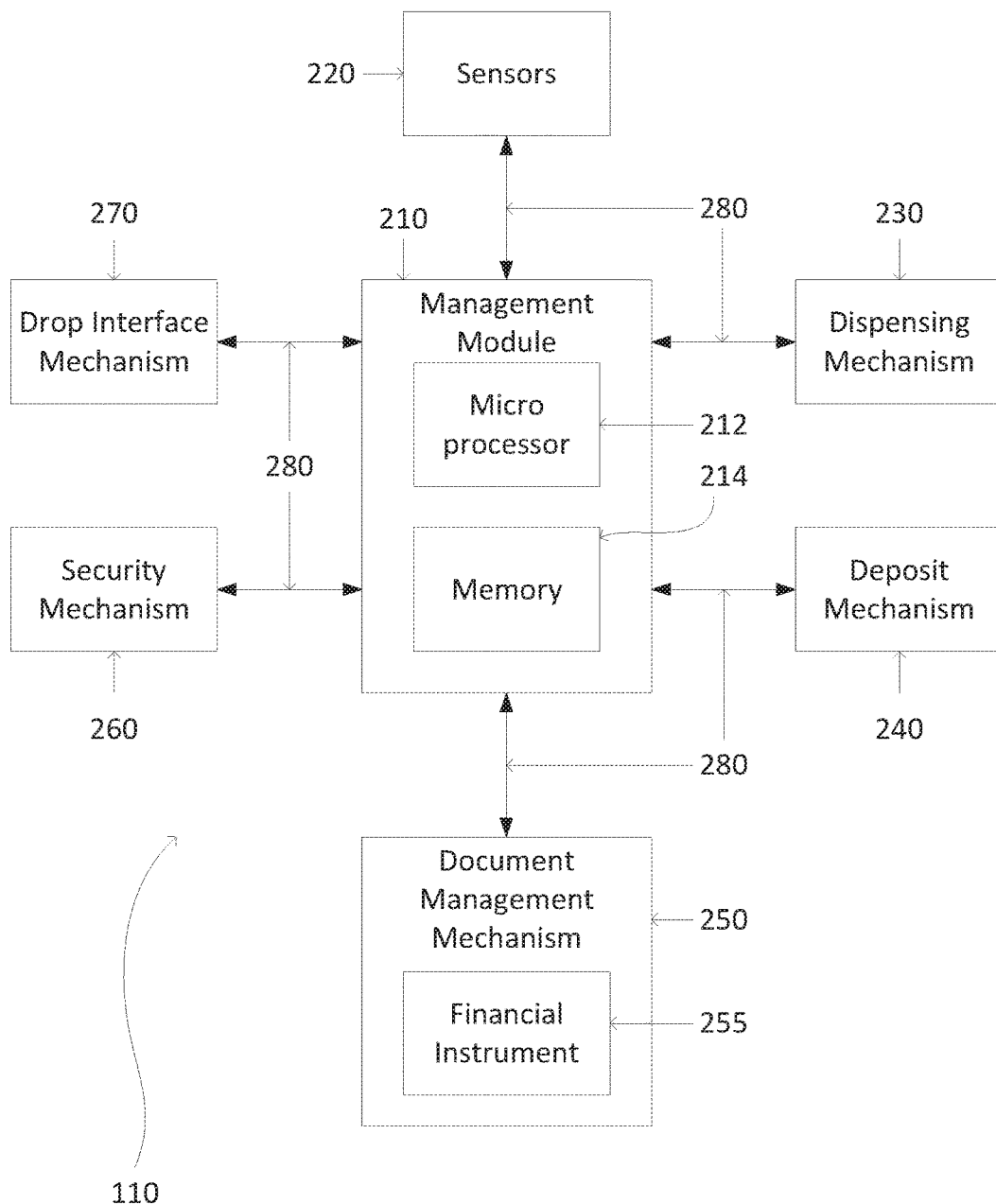
FIG. 3 depicts one embodiment of the interactive financial management system of FIG. 2.

Turning now to FIG. 3, illustrated therein is an exemplary embodiment whereby several components are connected to management module 210. It is contemplated herein that interactive financial management system 110 may utilize a single component as illustrated in FIG. 3, all of the components illustrated in FIG. 3, and/or any combination and/or sub-combination thereof, including without limitation a plurality of a single component (e.g., multiple dispensing mechanisms 230). It is further contemplated herein that the components may be removed and/or added/connected to interactive financial management system 110 dynamically (e.g., "hot-swap" (i.e., while interactive financial management system 110 is operating)) and/or at scheduled and/or unscheduled times.

The Currency Management Device:

In one embodiment, document analysis engine 113 determines the characteristics of documents that are present in interactive financial management system 110. In one example, document analysis engine 113 may analyze a check that has been input to determine the amount the check is for, who the check is payable to, the check's payor (e.g., the individual and/or the institution), the date of the check, and/or whether or not the check is void or valid. In another example, document analysis engine 113 also examines currency that has been input into interactive financial management system 110. The examination may be based on the appearance of the currency and/or checks (e.g., surface appearance and/or appearance of watermarks and/or physical features within the document), the shape of the currency (e.g., width, length, thickness), and the texture and/or bendability/flexibility of the currency.

Document management engine 116 manages documents being input and output from interactive financial management system 110. For example, if user 130 wishes to withdraw $100.00, document management engine 116 and/or the user may select the bills to be dispensed (e.g., a single one-hundred dollar bill, five twenty dollar bills). In another example, document management engine 116 may determine whether a currency bill is too worn and/or torn to continue to be used, in which case document management engine 116 may determine that the bill should be taken out of circulation (e.g., via notifying a central authority that the specific currency bill is being taken out of circulation and/or destroying the same (e.g., via shredding the bill(s))). In one embodiment, a bill to-be-destroyed is first imaged, and said image is saved and/or forwarded to a relevant authority.

Document management mechanism 250 manages financial instruments 255 that are located within interactive financial management system 110. It is contemplated herein that financial instruments 255 may be, for exemplary purposes only and without limitation, any currency, check, and/or any instrument of value (e.g., gift card) as would be recognized by those skilled in the art. Examples include but are not limited to currency issued by governments (e.g. United States, Japan, China), currency issued by governmental institutions (e.g. Euros), non-governmental currency (e.g. bank issued currency, coupons, gift certificates, credits, etc., and/or electronic currency (e.g. bitcoins)). In one example, if a document (e.g., a $20 bill) is determined to be too worn and/or torn, document management mechanism 250 may communicate that said document is being taken out of circulation and not dispense said bill to a user (e.g., by placing said bill in a different location, by destroying and/or damaging said bill via a chemical).

Power engine 114 manages the power supply for interactive financial management system 110. For example, power engine 114 may determine what power sources are available, and based on that information select one or more power supplies to operate interactive financial management system 110 and/or its components. Power engine 114 may be utilized to power financial management system 110. It is contemplated herein that any power transfers described and/or referenced herein may be performed wirelessly as would be recognized by those skilled in the art.

In one embodiment, power engine 114 may utilize both a battery and a power input (e.g., AC current, DC current, solar power, etc.), although it is contemplated herein that power engine 114 may utilize any power supply mechanism as would be recognized by those skilled in the art. In one embodiment, power engine 114 may utilize a connection to user's 130 personal computer device 135 (e.g., smart phone) whereby financial management system 110 receives power and operates based on power from user's 130 personal computer device 135.

In one embodiment, drop engine 115 manages whether interactive financial management system 110 should perform a transfer, such as a bulk transfer. For example, if interactive financial management system 110 contains a large amount of documents and/or a large amount of currency, drop engine 115 may determine that at least some of those documents should be dispensed to another location (e.g., drop engine 115 may determine that several of the large currency bills should be bulk unloaded via a connected vacuum tube). Drop engine 115 may also determine which documents should be included in any transfers.

With respect to the terms "currency management device," "currency-dispensing," and "currency management," it is recognized herein that this disclosure may be directed at and refer to any device or mechanism that is associated with dispensing any items of value. For exemplary purposes only and without limitation, any items of value may be dispensed, accepted, and/or managed, such as, physical currency, gift card(s), checks, coupon(s), eCurrency, and/or anything, tangible or intangible, of value that may be utilized in coordination with this disclosure.

Communications Means:

In one example, communications may be established between interactive financial management system 110 and user's personal computing device 135 (e.g., Bluetooth NFC, WiFi). These (relatively) short range communication means/methods may be utilized to confirm that the unit and the user('s mobile device) are co-located within a short distance of each other. In one or more embodiments, communication engine 117 manages communications to/from interactive financial management system 110. As described more fully herein, the unit's communications with interactive financial management system 110 may be directly with a user's mobile device, and/or indirectly with said mobile device via an intermediary server (e.g., server management device 120).

In another example, communications between interactive financial management system 110 and user's personal computing device 135 may be enabled by at least one of the two devices propagating a Wifi network that the other device logs on to. In still another example, communications between interactive financial management system 110 and user's personal computing device 135 are enabled by a physical wire connecting the two devices. In another example, communications between interactive financial management system 110 and user's personal computing device 135 is enabled by user's personal computing device 135 communicating to server management device 120, which forwards said communications on to interactive financial management system 110 (e.g., by sending the exact communications on, by translating the communications from user's personal computing device 135 into a separate protocol that server management device 120 and interactive financial management system 110 communicate over).

In yet another use case, communications may be conducted via audio means. For example, system 110 may emit audio sounds that a nearby user may respond to via interactions with user's personal computing device 135. In another example, communications between system 110, user's personal computing device 135, and/or the user may be conducted via audio means (e.g., system 110 and personal computing device 135 may interact via audio sounds (either audible and/or inaudible)).

The interactive financial management system 110 may also provide a touch point, such as a hard-wired connection, to connect the user 130, the user's smart phone, or wearable technology into a body area network (BAN) whereby information pertinent to the system's active incentive, function, state, or use statistics may be transmitted, via the touch point, without broadcasting the signal over the air.

It is contemplated herein that financial management system 110 may function even if neither financial management system 110 nor a computing device associated with the user (e.g., the user's smartphone) has a network connection; in this situation, the transaction may be stored by financial management system 110 and/or user's personal computing device 135 and later communicated to server management device 200.

Receipts and/or records of transactions with financial management system 110 may be sent to one or more devices/accounts associated with the user, such as an email account and/or a text message. Alternatively, receipts may be printed, such as on paper.

In yet another example, a user could touch the device, and the user's body could be utilized as a communication medium between the device and an electronic device of the user's (e.g., (smart) wearable, cell phone, etc.). Thus, electrical signals are propagated across the user.

Physical Components, and Management Thereof:

In one embodiment, component engine 112 manages the components of interactive financial management system 110 (best shown in FIG. 3). For example, component engine 112 may manage which components of interactive financial management system 110 are currently connected to interactive financial management system 110, how those components are being utilized.

Component engine 112 may also manage which components may be experiencing and/or about to experience failure and/or error (e.g., if the dispensing mechanism is not operating correctly, component engine 112 may determine the same, and also communicate that information to server management device 12). Further, component engine 112 may repair and/or improve any components that are operating at less than optimal efficiency and/or effectiveness. Also, component engine 112 may empower financial management system 110 to be enlargeable and/or capable of being reduced in size.

In one embodiment, sensing engine 111 manages information collected by sensors 220 (best shown in FIG. 3), including determining when to gather information, what information to gather, and how to analyze and utilize the information that has been gathered.

Sensors 220 may be utilized to scan and/or analyze, visually or otherwise, denominations and/or financial instruments (e.g., checks) that are deposited into financial management system 110. In one embodiment, sensors 220 include at least one currency or negotiable instrument validator that can detect whether currency or a negotiable instrument that has been deposited is counterfeit or legitimate.

In one embodiment, sensors 220 include at least one biometric identification device to determine the identity and/or identifying information about the person or persons that are near financial management system 110 (e.g., the person that is utilizing financial management system 110). Such biometric identification devices may include functionality to detect various biometric characteristics of people (e.g., fingerprint scanners, facial recognition systems, voice identification systems height/body shape recognition systems, retinal scans, vein scans). In at least one embodiment, the biometric scans may be utilized to detect duress/agitation by the authenticating user, and if the duress/agitation exceeds a predetermined threshold (e.g., either a static threshold across all user and/or a threshold unique to that user based on previous measurements) then a government authority may be contacted (e.g., the police) and/or a financial institution (e.g., a bank that the user is interacting with). This information may be utilized to inform whether to continue interacting with said person being analyzed.

Sensors may also include a temperature sensor and/or a humidity sensor, and said sensor(s) may be utilized to verify that any bills of currency are not getting overly damp. Sensors may also include a GPS device that assists financial management system 110 in determined its location. Sensors may also perform drug detection on any document submitted to financial management system 110, including on any currency (and an alert of said drug detection may be forwarded to one or more appropriate authorities).

Dispensing mechanism 230 may be utilized to dispense documents (e.g., currency, checks) out of financial management system 110. In one embodiment, a single dispensing mechanism 230 will output several denominations of currency (e.g., $20 bills, $5 bills, and $1 bills), and in another embodiment, there may be a separate dispensing mechanism 230 for each currency denomination. For example, dispensing mechanism 230 may comprise a structure with at least one slot dedicated to each denomination of currency—for example, a $1 bill slot, a $5 bill slot, a $20 bill slot and so forth. In another example, dispensing mechanism 230 may provide functionality to issue eCurrency through communication link 75 to user's 130 personal computing device 135.

Deposit mechanism 240 may be utilized to provide documents (e.g., currency, checks) to financial management system 110. In one embodiment, a single deposit mechanism 240 will receive and process all currency denominations and/or documents (e.g., checks), and in another embodiment, one or more deposit mechanism 240 may receive and process different documents/denominations (e.g., one deposit mechanism 240 for checks and one for all currency; one deposit mechanism 240 for checks and a separate deposit mechanism 240 for each currency denomination). For example, deposit mechanism 240 may comprise a structure with at least one slot dedicated to each denomination of currency—for example, a $1 bill slot, a $5 bill slot, a $20 bill slot and so forth. In another example, deposit mechanism 240 may comprise a cash-drawer-like structure with a slot for each denomination.

Security mechanism 260 may be utilized to protect financial management system 110. For example, security mechanism 260 may be an audio alarm, visual alarm, network alarm (e.g., network communications to another party such as police), an ink dispensing mechanism that will be deposited on all documents (e.g., checks, currency) within financial management system 110, and/or any combination thereof. For example, security mechanism 260 may include a movement/location sensor (e.g., accelerometer, gyroscope, GPS device) and/or an ink dispenser. It is contemplated herein that the movement/location sensor(s) may be utilized to detect not only motion subsequent to installation, but may also be utilized to detect installation parameters (e.g., has the device been installed on a level surface, a stable surface, a stable area). Based on analysis of installation parameters, a warning and/or notification may be generated and communicated to a party regarding whether financial management system 110 needs installation modification work performed.

If financial management system 110 is moved without authorization, ink dispenser may mark or destroy the currency stored in financial management module by spraying the currency with ink. In another example, security mechanism 260 may comprise functionality to erase or electronically wipe some or all of the data from financial management module.

Drop interface mechanism 270 may comprise an automated system that removes or "drops" various quantities of currency when such currency exceeds a certain threshold. For instance, financial management system 110 may be configured to retain $10,000 and if users 130 were to deposit more than $10,000 into financial management system 110, then drop interface mechanism 270 may remove the currency in excess of $10,000 from system. Collecting the currency in excess of $10,000 and transporting it to a drop location, such as a drop safe, may accomplish such removal. Such transport may be accomplished through utilization of a drop safe system or cash carrier tube system that is interfaced with financial management system 110 through drop interface mechanism 270.

Front End-User Interactions:

In one embodiment, if a user is approaching financial management system 110 then user's personal computing device 135 may alert the user to that fact and concurrently (or near concurrently) provide an option to user's personal computing device 135 that allows user to "click here" for fast cash. The amount of cash may be presented as an option to the user, and/or the amount of cash may be related to how much the user typically withdraws. In this and/or other embodiments, the user's personal computing device 135 may function similarly and/or the same as a key fob with respect to the user authenticating herself with financial management system 110.

In one embodiment, the software executing on user's personal computing device 135 and/or financial management system 110 is a (ultra) thin client, and thus most if not all of the true executable functionality is present at server management device 120.

Further, it may be determined whether a deposited check has been properly endorsed, and if so, one or more images of the check may be communicated so as to enable and/or initiate remote deposit of the check.

It is also contemplated herein that a user may interact with server management device 200 to effect a transfer of funds (e.g., $20) to a different user, and said transfer may be conducted as would be recognized by those skilled in the art (e.g., user's personal computing device 135).

In one or more embodiments, users may interact with financial management system 110 via solely via a personal computing device (e.g., smart phone) of the user, and financial management system 110 has no output devices (e.g., screen) and/or input devices (e.g., keyboard).

One exemplary use starts via a condition of a Financial Management Module (e.g., currency management device) being identified (e.g., that the device is low on funds). Subsequently, a request is generated (e.g., deposit currency in the device that is low on funds) and a reward (e.g., an incentive) is also identified. Then, optionally, at least one of the users accepts the offer (e.g., helping with load balancing in exchange for a reward), the condition of the device is monitored, and if it is confirmed that the user performed the requested activity, then the user is supplied the reward.

With regards to identifying a condition of the device, it is contemplated herein that this condition and identification may relate to any of several different factors. In the above-referenced example, the condition could relate to a device being low on currency (or the condition could relate to a device having too much currency). In another example, the condition of the device may be that the device is presently low on funds and/or of a specific denomination of bills (e.g., it may have plenty of $20 bills, but relatively few $10 bills).

In another example, the condition identified may relate to a future event, and so the step of identifying the reward/incentive may precede the event. Said future event may be a social event (e.g., sporting event, concert, musical, rally, and/or any other expected congregation of people). Thus, the future event may be any occurrence where it is expected that a plurality of people/users will gather in the vicinity/location of the device in question (e.g., it is contemplated herein that, for exemplary purposes only, in the vicinity/location of the device, a.k.a. near the device, may be 50 yards, 500 yards, ½ a mile). The future event may also be a catastrophic event, such as a weather event, a forest fire (caused by humans and/or caused by nature (e.g., lightning)), and/or a catastrophic event (e.g., an earthquake).

In one situation, at least part of the information upon which the determination of a future event is based, is received from one or more users. For example, a user could notify a device (e.g., directly, indirectly via service management device 120) that a future event will occur (e.g., a previously unscheduled political rally). This information may include an estimate of a number of people that will be in identified area(s). Then, optionally after confirming the accuracy of the information and/or the likelihood of the event transpiring, (1) the notifying user(s) may receive a reward in exchange for the helpful information, and (2) one or more devices may be associated with a condition relevant to the newly identified event (e.g., that they may need extra currency).

With regards to communicating an activity request to a user as well as identifying and communicating a reward to the user, it is contemplated herein that one or more methods of practicing the embodiments described herein may include either and/or both of these steps, alone or in combination/concurrently. In short, not every implementation described herein requires that both steps be performed, and of the implementations in which both steps are performed, they may be performed in any order and/or combined together if practicable.

For exemplary purposes only, if a particular financial management system 110 is running low on cash and/or a certain denomination of currency (e.g., $5 bills), a user may be sent a message that indicates an incentive (e.g., an extra 1% bonus for the amount deposited, free goods and/or service (e.g., a free cup of coffee)) to do the requested action.

For exemplary purposes only and without limitation, if a person inquires about a nearby interactive financial management system 110 to make a deposit (which may include the person actually initiating a deposit at a device), the user may be notified and directed to another interactive financial management system 110 that is low on currency, and said user may be notified of an incentive to use that specific interactive financial management system 110. In one example, a default condition and/or set of conditions may be utilized to determine when a reward condition is available and/or can be communicated to a user (e.g., a retailer). It is contemplated herein that the condition(s) may be personally customized by the user and/or by an entity managing financial management system 110 (e.g., a bank), such that an individual user/retailer receives notices either more or less frequently (e.g., the notices may be customized to only be sent for very large rewards, which would be less frequent).

In one or more embodiments, a user identifies that they will perform an activity requested (e.g., depositing $100 in a specified device). At that point the offer may be rescinded before it can be accepted by (many) more users (and thus risk over-filling the device). In an alternative use case, the offer may be modified after a certain amount of people have indicated that they will perform the requested activity. Thus, the first (several) person/people to accept the offer to deposit currency, and/or the first (several) person/people to actually deposit money, may be given a greater/more valuable reward. In one example, the offer could indicate that the first ten people to supply a deposit get credit of 105% of the amount deposited, the next twenty people to supply a deposit get credit of 102% of the amount deposited, and the next thirty people to supply a deposit get credit of 101% of the amount deposited. In another example, the offer could indicate that the first $1,000 deposited gets 105% credit, the next $5,000 gets 103% credit, and the next $5,000 gets 102% credit. Although specific numbers of people and specific amounts of predetermined levels of currency deposit amounts were identified in these examples, it should be clear that it is contemplated herein that any number of peoples and/or amounts of currency may be utilized to practice the scope of the method(s) described herein. Further the offer may be rescinded and/or modified based on indicated acceptance and/or actual/partial performance of the request.

With regards to monitoring the device's condition, it is contemplated herein that the monitoring may be performed by the devices themselves (e.g., the FMMs), and/or the user's personal computing device (e.g., the user's smart phone). With regards to providing the reward, it is further contemplated herein that providing the reward may comprise both the steps of providing the reward (e.g., providing extra credit, providing the gift card) as well as providing the user a notification that they have accrued and received the reward.

The requested action may include, for exemplary purposes only and without limitation, withdrawing currency, depositing currency, withdrawing a specific denomination of currency, depositing a specific denomination of currency, providing power to the currency dispenser (e.g., via a mobile device of a user, via a vehicle of the user), and/or repairing the device and/or a component of the device.

In another embodiment, if it is determined that the user regularly and/or periodically withdraws currency, an entry may be added to a calendaring system for the user that may be utilized to remind the user to pick up currency from a financial management system 110 (e.g., via a calendared event). Building from that example, if a user withdraws currency once a week, then the device may anticipate the future need for that currency and identify a future event/need based on that. More specifically, for exemplary purposes only, if a user regularly withdraws $500 (from a specific device), and currently the device has an amount of currency that is barely above a predetermined threshold that is associated with having too little available currency (e.g., the device has $5,200 in currency and below $5,000 is the predetermined threshold with respect to whether a device and/or that specific device is running low on currency), then the device may anticipatorily create an event indicating a shortage of currency based on the likely future event of the user withdrawing $500 from the device. Similarly, if a local business regularly deposits currency at a certain time and/or day, even if the device has an amount of currency below the predetermined "low" threshold (e.g., the device has $4,800 and the threshold is $5,000), because the business is expected to perform a (substantial) deposit, an event may anticipatorily NOT be created and acted upon because of the likely future event leading to the device not needing additional currency.

In one or more embodiments, distribution management engine 122 monitors and manages the distribution of items representing value (e.g., currency). For example, distribution management engine 122 may identify one or more interactive financial management system(s) 110 that are running low on currency and need to be refilled. Distribution management engine 122 may then identify a possible reward (e.g., coffee, a bonus, a gift card, a credit, currency) that may be offered as a benefit that may accrue to whomever partially and/or fully solves the problem of a unit being low on currency. For example, it is contemplated herein that the bonus provided to a user may be dependent and/or related to the amount of money that the user deposits in the machine (e.g., if the user deposits $100 then the user is entitled to a 1% bonus, whereas if the user deposits $500 then the user is entitled to a 2% bonus). Subsequently, distribution management engine 122 monitors the previously identified unit(s) to determine whether and/or to what extent that unit's shortcoming/issue (e.g., being short on currency) has been solved/addressed. In response to the unit's shortcoming/issue being solved, users may receive a message that, for the immediate future, the possibility of the user(s) accruing a benefit may be temporarily suspended until an issue is identified in the future. Determining whether a unit(s) issue was addressed may be determined based on communication from, via communication engine 117, of the interactive financial management system 110.

In another exemplary use case, a request for a user-initiated transaction is received, and then device(s) to perform the transaction are identified, an adjustment incentive is determined for at least one of those device(s), and then the device identification(s) and the adjustment incentive(s) are communicated to the user, the user's selection is received, and finally a user optionally and preferably authenticates before receiving the funds.

With respect to receiving a request for a user-initiated transaction, it is contemplated herein that this may occur any of several ways. For example, a user could utilize an electronic device (e.g., a smart phone) to indicate that they wish to perform a transaction. The indication may include an amount of money the user wishes to receive and/or specific currency denomination(s) that the user wishes to receive.

In another example, the user may have a calendar entry of an event associated with the user withdrawing money. In this example, the existence of the calendar entry/event is what the request for an interaction is based on (e.g., because the user has a calendar entry of a weekly withdrawal of $200 from a specific FMM or group of FMMs, before a specific entry of that calendar event a request for a transaction is sent, on behalf of the user, for that event to occur again). This event may be a recurring event, and/or this event may be non-recurring. For example, a user may withdraw currency every Monday morning on their way to work. In one situation, the systems and/or methods described herein identify that the user periodically withdraws money and, based on that, automatically add that recurring event to the user's calendar. Alternatively, the user may manually add such a recurring event to the user's calendar. It is contemplated herein the user's calendar may be any software-implemented scheduling mechanism that may be utilized to manage and/or keep track of scheduled and/or past events for the user (e.g., a calendar software in the user's smart phone).

With respect to identifying one or more FMMs, it is contemplated herein that such may be accomplished and practiced in any of several ways. For example, the request (e.g., generated by the user) may identify a geography for the transaction. Such as, the user may specify a location or area where they want to withdraw money from. Or, the user may fail to identify a geographic location/area and a default option of the user's current location may be utilized. Or, the user may not explicitly identify a geographic location/area but the location(s)/area(s) queried and/or analyzed are based on other information, such as the user's habitual path (e.g., the user frequently takes a previously identified route at that time and day that the request is initiated (e.g., if the request happens at 7:30 AM Monday morning, the system(s) may (correctly) assume that the user will be on his/her way to work)), a travel route that the user will take (e.g., if the user is scheduled to be taking off on a plane at the airport in three hours, the system(s) may identify FMMs that are on the and/or a possible route to the airport), and/or a travel route that the user may take (e.g., the user hasn't filled up their vehicle's gas tank lately, so FMMs at/near gas stations may be referenced for the location analysis).

In one use case, for exemplary purposes only imagine that a user has a flight that is departing in two hours. The user could indicate that they wish to withdraw money. Based on that indication, and further based on the fact that the user is needs to be at the airport before the flight departs (e.g., an hour before the departure), the system may identify one or more currency dispensers, on the user's way to the airport, that the user may utilize. Further, the system may calculate an expected "diversion time delay" (e.g., the amount of time the user is delayed in getting to the airport because of stopping at a currency dispenser) for at least one of the currency dispensers, if not each of them. Thus, the user may be presented (1) the best option, such as the quickest option, and/or (2) a plurality of options of currency dispensers that the user may stop at. Additionally, the user may also be informed that there are one or more currency dispensers where the user is traveling to (e.g., the airport and/or city where the user is flying to). Thus, the system's analysis may include a determination and recommendation that the user not use any currency dispensers on the way to the airport (e.g., because it unacceptably increases the chance that the user may miss the flight), and instead use a currency dispenser at the destination location.

Several different methods of determining an adjustment incentive to induce user behavior are contemplated herein. In one exemplary situation, the adjustment incentive may include a reward/benefit for the user to perform the requested action at a specified FMM. For example, if a user indicates that the user is looking to withdraw $50 via five ten dollar bills, the system(s) described herein (e.g., distribution management system 122) may identify several devices that have enough $10 bills, and one in particular (Device A) that has a surplus of ten dollar bills. In this example, the incentive for the user to utilize Device A may be determined to be financial (e.g., the user only has to pay a percentage (e.g., 99%) for the $50 withdrawal (which would be $49.50 charged to the user for the $50 he/she withdrew), the user gets a fixed amount reduced from the exchange (e.g., $1 off) (which would be $49.00 charged to the user for the $50 he/she withdrew)).

In another exemplary situation, the requested action by the user is a deposit of $100, and the system(s) described herein identifies one or more devices (e.g., two devices: Device B and Device C) that would benefit from a deposit of currency. This determination that those devices would benefit from a deposit may be based on the amount of currency each device has at the moment (e.g., a "present amount of currency") and/or it may be based on an amount of currency each device is expected to have at some point in the future (e.g., "an expected adjusted amount"). In one exemplary use case for this, an indication of the expected adjusted amount for an FMM may be sent to a user, even though the present amount of currency for the FMM is a different amount/number.

It is contemplated herein that the expected adjusted amount of currency in a device may be based on a combination of how much currency the device currently has and also what future transactions are expected to take place that involve the device. For example, if the device presently has $5,200 and three withdrawals totaling $1,300 are expected to be withdrawn from the device at some point in the (near) future (e.g., next few minutes, next few hours, and/or any time frame as would be contemplated and recognized by those skilled in the art) then the expected adjusted amount of currency for that device may be $3,900 (i.e., $5,200 minus $1,300). Thus, because an expected adjusted amount of $3,900 may be below a threshold (e.g., a threshold of $5,000, which may or may not be predetermined), then the incentive for a user to deposit $200 in that device may be substantially higher than the incentive for the user to deposit $200 in another device that may not need that $200 (as badly) (e.g., the incentive to utilize that device may be that the user will be given credit of 10% of what they deposit in addition to the amount they actually deposit (which, in this example, would mean the user gets credit for a $220 deposit even though he/she only deposited $200)).

Although incentives and benefits described herein have thus far primarily been financial, it is contemplated herein that the incentives/benefits/rewards may be financial (percentage and/or fixed amount), gift cards, reward points, reduced prices for goods (e.g., gasoline) and/or services, and/or any other incentives/benefits/rewards as would be recognized by those skilled in the art (e.g., credits towards a service/product).

Several different methods of communicating this information and displaying it to the user are contemplated herein. In one exemplary use case, information identifying the one or more FMMs and/or information identifying the one or more incentives is (also) sent to the user.

With respect to displaying the information to the user, in one situation the information is displayed via a map. For example, a map of an area (which, as described above, may be around the user and/or around a route designated by the user) is displayed to the user. The location of the FMMs may be overlaid on the map and accompanying text indicates what incentives, if any, are in place for that FMM. Alternatively, the location of the FMMs may be overlaid on the map and a color-coding (of one or more FMMs) indicates what incentives, if any, are in place for that FMM. In yet another alternative, the color-coding may relate to a condition of the currency dispenser (e.g., low on currency, low on specific denomination(s), an abundance of currency, etc.). Further, it is contemplated herein that the incentives in place for an individual FMM may be communicated and displayed to the user via accompanying text (mentioned above herein), color-coding (mentioned above herein), a list of one or more FMMs (and their associated incentive(s)) may be displayed to the user, and/or any display means as would be known and recognized by those skilled in the art.

The information of the incentives may also be communicated to multiple members with a real-time bidding process associated with the incentive. The members bid on the value of the incentive that is acceptable to them and the bidding process provides the incentive to the member that was determined the most beneficial incentive. This incentive can be a fixed value or a value that changes with time.

Further, it is contemplated herein that the incentive(s) associated with a single FMM may include a plurality of possible incentives. For example, if a user indicates that they would like to deposit $100 in an FMM, the incentives associated with an FMM (and presumably displayed and/or communicated to the user), may include a tiering of incentives. For exemplary purposes only, the user may be notified that they will receive incentive A (e.g., a 1% bonus on their deposit) if they deposit between $50 and $99, the user may be notified that they will receive incentive B (e.g., a 1.5% bonus on their deposit) if they deposit between $100 and $149, and the user may be notified that they will receive incentive A (e.g., a 2% bonus on their deposit) if they deposit between $150 and $250. Thus, the incentives identified may be with respect to events (e.g., a deposit other than for $100) that are other than the event indicated. Further, a plurality of the FMMs communicated to and displayed to the user (up to an including each FMM) may also include a plurality of associated incentives.

The user selection may be received and/or indicated via any of several different ways. For example, the user may indicate a selection of one of the FMMs (e.g., via a selection of an FMM displayed in a map to the user on a smart phone). Alternatively, the user may start interacting with an FMM without a previous selection of that FMM having been indicated (e.g., the user proceeds/walks directly to an FMM without having first indicated which FMM the user will use).

Further, after an indication is received of the user's selection, the funds desired by the user may be "locked" in for that user. For example, if the user initiates the transaction by indicating that the user wishes to withdraw $200, and in response to receiving a map of FMMs the user selects a specific FMM, then that specific FMM may lock down $200 for that user. Thus, for exemplary purposes, if the FMM has only $300 left and a user indicates that they would like to withdraw $200 from the FMM, and if in the interim before the user gets a chance to withdraw the $200, a second user attempts to withdraw $120, then that attempt will be denied (and optionally the second user will be told that only $100 is available for withdrawal).

The user may also be able to lock a specified amount of money or denominations at a specific FMM for withdraw during a certain time period.

Finally, the user may authenticate. This may be performed via a mobile device of the user, via the FMM, and/or via a combination thereof (or via other means as would be known and the art and/or described herein). The user authentication may be based on biometric measurements of the user and/or people near the user. Such biometric readings could be any such as would be recognized in the art (e.g., facial, retina, fingerprint, voice, blood vein recognition, body type, body weight, body height, body shape, posture, etc.). Further, it is contemplated herein that the biometric readings may be performed via the FMM and/or a mobile device of the user.

Additional authentication may performed via the user utilizing their cell phone to read a code and/or indication on the FMM. For example, the FMM may display a code, such as a QR Code (e.g., via a static code displayed, via a dynamic code that changes periodically (e.g., every minute, every day, every user-transaction)). Continuing with this example, the user may scan the code via the user's cell phone, and use the code to authenticate. The code may be transmitted via visual representation, digital information encoded on a propagating radio signal, a contact digital transmission where the conducting medium is the user's skin. This process may be practiced in any way that is practicable and would be recognized by those skilled in the art. For example, the code could be translated, via a protocol, into a URL (e.g., a web address), and the act of accessing the web page (either with or without information that uniquely identifies a mobile device (e.g., smart phone) of the user), satisfies the requirement of the user being authenticated. In another example, the code could be utilized via an application (e.g., other than a (mere) web browser as in the previous example) to assist an authentication means (e.g., passing some and/or all of the (translated) information in the code to another computer (e.g., a remote server that is associated with the FMMs and that can serve to authenticate that the user's cell phone indeed read information from a code on a specific FMM)). Alternatively, the code could be utilized to pass information on to the FMM itself (thus obviating and/or mitigating the need for an intermediary server).

Further, in one or more embodiments described herein, a process is performed to ensure that the user does not withdrawal from a first FMM that is itself low on funds in order to enjoy the benefit of depositing in the second FMM that is low on funds. In effect, if the user learns of an incentive (e.g., 5% bonus) for depositing $500 in FMM #1, the user may attempt to gain that 5% bonus by withdrawing $500 from FMM #2. However, it is contemplated herein that the user may be told that their eligibility for the bonus is dependent on them not retrieving money from other (specific) FMMs (that may themselves be low on money). For example, if the user starts to withdraw money from an FMM, they may receive a notice that completion of that currency withdrawal renders the user ineligible to receive bonuses with respect to other FMMs for a specified period (e.g., time: 5 minutes, 1 hour, 12 hours, 1 day; area: FMMs nearest the FMM from which the withdrawal took place, FMMs within 0.5 miles of that FMM, FMMs within 1 mile of that FMM).

The cloud service may also actively calculate the amount of cash that users currently have on their person. This can be accomplished with an active sensor in the individual's cash holding implement, or by predicting the cash decline rate based on electronic receipts of purchase from the members.

In one exemplary use case, a map that is displayed to the user (that includes one or more currency dispensers), may include a path to at least one of the currency dispensers (e.g., a path from the current location of the user and/or a projected future location of the user, to at least one of the currency dispensers (e.g., a selected currency dispenser)). Alternatively, and/or in the same use case, the map may be a three-dimensional map. Also, it is contemplated herein that the user's mobile device may communicate the directions to the user (e.g., as the user is progressing along the path, the user is given time-sensitive directions to the user's destination).

It is further contemplated herein that the user may be presented an image of the FMM/currency dispenser to which the user is going. For example, if it is projected (e.g., according to the path communicated to the user) that the user will approach the FMM from a certain perspective (e.g., from the south), then the user may be presented an image of the FMM (and any surroundings) from the same and/or a similar perspective, thus enabling the user to more easily and readily identify the FMM and confirm that the user has been led to the correct location.

Finally, in one or more of these use cases, it is contemplated herein that the image communicated and displayed to the user of the at least one currency dispenser, may be modified so as to indicate what incentive(s), if any, are associated with and being offered for actions relating to that currency dispenser (e.g., the image of the currency dispenser may be amended to include an image of "2%" above it, such as if the bonus for the action for that currency dispenser is a 2% bonus.

Figure 4:
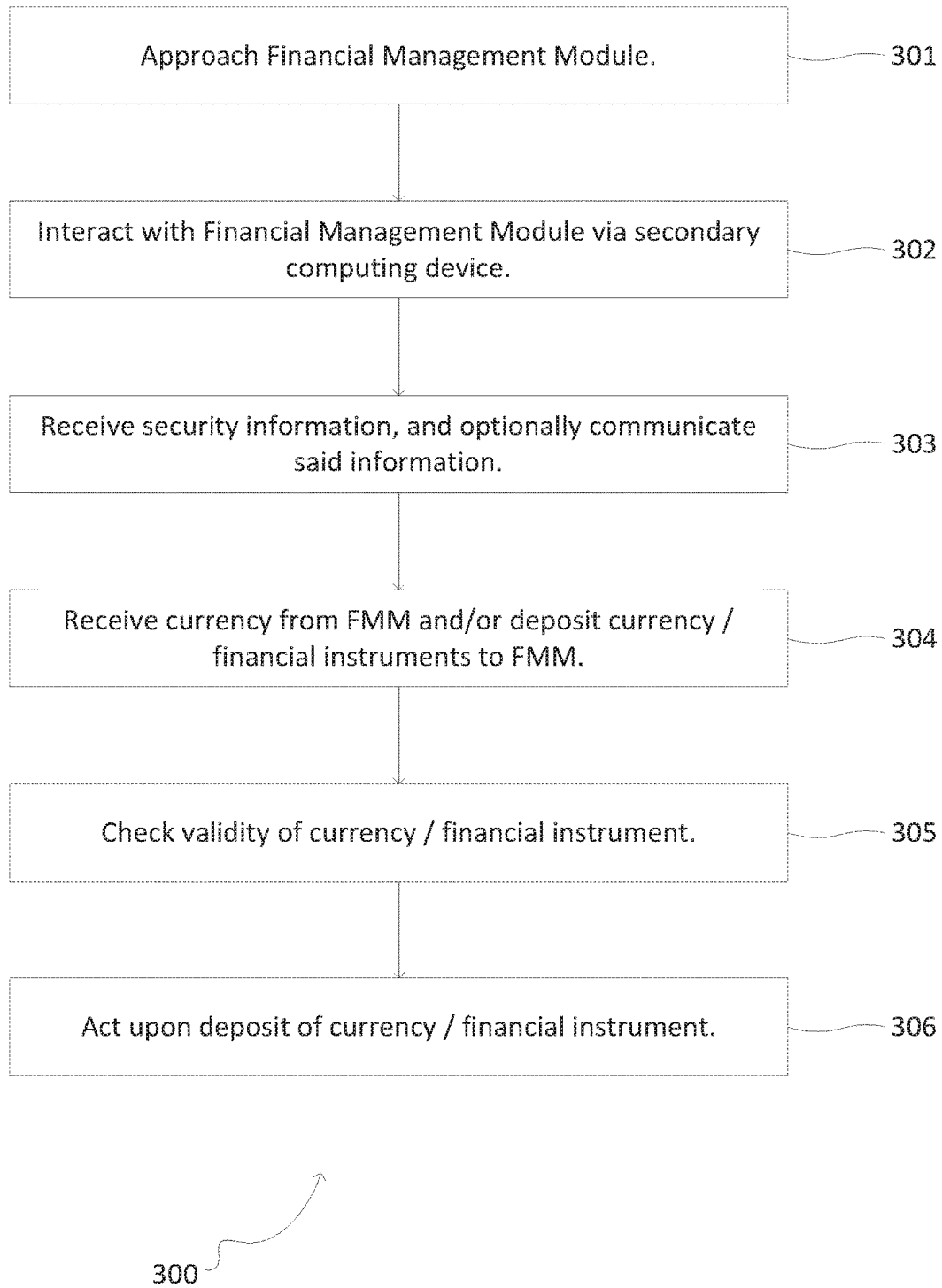
FIG. 4 is a flowchart depicting another illustrative operation of the system of FIGS. 2 and 3.

Exemplary Utilization:

Referring to FIG. 4, exemplary operation of a process 300 of utilizing system 100 will now be described for illustrative purposes. In step 301, an interactive financial management system 110 is identified and approached to be utilized. Subsequently, user 130 interacts with financial management system 110 via user's 130 personal computing device 135 (e.g., smartphone). User 130 may initiate interaction with financial management system 110 via scanning an image (e.g., a QR code) on financial management system 110, and information in that image may lead user's personal computing device 135 to remotely communicate with server management device 120 (and thus, (indirectly) communicate with financial management system 110). In one embodiment, the QR code represents a static ID code and concatenated thereto is a dynamic PIN (in this embodiment the image is displayed via an electronic display, and thus the image (e.g., QR code) may be constantly (e.g., once every minute) changing).

In one or more embodiments, user's personal computing device 135 interacts with financial management system 110 via server management device 120. More specifically, for this example, user's personal computer device 135 sends and receives messages from server 120, and server 120 sends and receives messages with financial management system 110. In another embodiment, user's personal computing device 135 interacts directly with financial management system 110.

In one embodiment, user's personal computing device 135 (e.g., a smartphone) is "paired" with financial management system 110, and for the duration of the pairing financial management system 110 is not eligible to pair with another (personal) computing device. Thus, in this embodiment, a (periodic) determination may be performed of the distance between user's personal computing device 135 and financial management system 110 and when that distance exceeds a predetermined threshold (e.g., 100 feet, a distance dependent on the area (e.g., in a crowded mall the distance may be 15 feet whereas on a relatively empty street the distance may be 150 feet)) then the pairing between user's personal computing device 135 and financial management system 110 is terminated (and an alert may optionally be sent to the user, such as to the user's cell phone). The distance may be determined via calculations dependent on GPS data relative to the both devices, the distance may be determined based on timing how long signals take to be transmitted between the devices, and/or any other means as would be known and recognized by those skilled in the art.

Security information is collected (step 303), such as image data relating to the user (e.g., facial recognition, height recognition, cornea recognition), and computerized information about user's personal computing device 135 (e.g., its MAC address, any ID for any component in user's personal computing device 135). Security information may also include motion sensors 111 that detect whether financial management system 110 is being relocated (e.g., stolen).

For exemplary purposes only, if security information indicates that the actual individual performing the transaction is impersonating someone else (e.g., a thief may attempt to utilize their victim's personal information to retrieve money), then the transaction may be terminated and an alarm may be sent to authorities.

If the security information does not warrant a negative reaction (e.g., alarm being issued, functionality being terminated), the currency and/or financial instruments are received from and/or deposited to financial management system 110 (step 304). In one example, a check may be deposited into financial management system 110. The check is confirmed to be valid, and accordingly the appropriate currency amount is transferred because of said check. Interactive financial management system 110 may then stamp the check with a voiding language (e.g., "VOID"), and the check is returned to the user. Alternatively, the deposited check may be retained by interactive financial management system 110 to be later sent and/or retrieved for physical inspection by the institution that issued the check to the user. In yet another alternative, drop interface mechanism 270 may transport one or more checks and/or documents (e.g., via a connected vacuum tube).

The validity of the currency and/or deposited financial instrument is then checked (step 305), such as by sensors 111. Additionally, in one or more embodiments sensors 111 detect whether the currency is torn and/or particularly worn out, and if this occurs, financial management system 110 may destroy and/or set aside said torn/worn document. For example, if a currency bill is detected to be unusable (e.g., too worn, torn), then interactive financial management system 110 may contact an authority (e.g., the Federal Reserve) to indicate that the bill is being taken out of circulation (e.g., the bill may be identified by the bill's serial number). Said unusable/damaged currency bill may be placed aside within interactive financial management system 110, and/or said bill may be destroyed (e.g., via ink, via a chemical that damages and/or destroys the bill).

Finally, the deposit and/or receipt of currency from financial management system 110 is executed, and the transaction is complete (step 306). In one example, a message may be sent to a user 130 that will deposit currency, that user 130 should order and/or arrange (e.g., all documents facing the same direction) the currency as directed. In another example, a user may deposit cash into interactive financial management system 110 and receive a form of eCurrency, including a notification that the same has happened.

In one or more embodiments, financial management system 110 dispenses a gift card and/or something that represents value and/or currency with one or more companies. It is contemplated herein that the gift cards have a $0 value until they are both (1) dispensed, and (2) value is deducted from another account (e.g., a user's account). Financial management system 110 may also dispense other forms of payment, such as a cashier's check and/or a certified check.

To administrator financial management system 110, it is contemplated herein that an alternative user interaction interface may be utilized that allows administrators, once properly verified and authorized (e.g., via a password and/or biometric authentication), may interact with and/or manage the functionality of financial management system 110.

Figure 5:
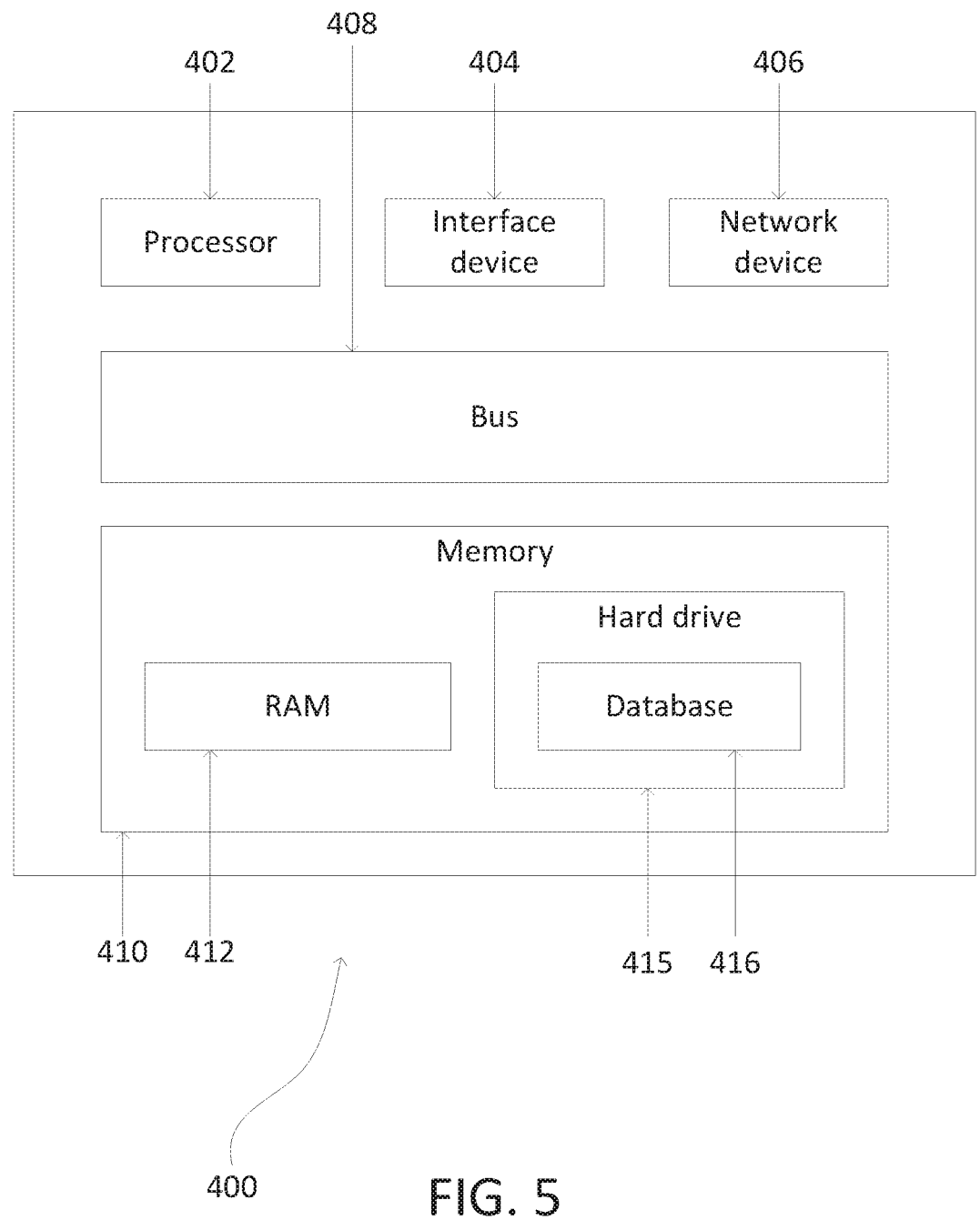
FIG. 5 is an exemplary embodiment of a computing device as might be used in FIGS. 1, 2, 3, and 4.

Referring to FIG. 5, illustrated therein is an exemplary embodiment of a computing device as might be used when utilizing the systems and methods described herein. In one embodiment, computing device 400 includes memory 410, a processor 402, an interface device 404 (e.g., mouse, keyboard, monitor), a network device 406. Memory 410 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 100, for instance, a telephone network, a local area network ("LAN"), the Internet, and/or a wireless network. In one example, memory 410 includes a series of computer instructions written in or implemented with any of a number of programming languages, as will be appreciated by those skilled in the art.

Memory 410 in one example includes RAM 412, hard drive 415, which may include database 416. Database 416 in one example holds information, such as information that relates to users and/or parties interacting with system 100.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 410 or separately in any of hardware (e.g., electronic circuitry), firmware, software, or a combination thereof. In one embodiment, engines/modules contain instructions for controlling processor 402 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

The following is claimed:

1. A method of utilizing a currency-management system that comprises a plurality of currency dispensers, the method performed using a processor executing instructions stored on a non-transitory computer-readable medium, the method comprising:
   receiving, from a user device and by the processor, a request for an interaction with a currency dispenser;
   identifying, by the processor, one or more currency dispensers, of the plurality of currency dispensers, to perform the interaction;
   determining, by the processor, one or more conditions of the one or more currency dispensers;
   generating, in response to the determination of the one or more conditions and by the processor, one or more incentives to induce a user associated with a device to perform the interaction with the one or more currency dispensers based on the one or more conditions;
   sending, to the user device and by the processor, information that identifies the one or more currency dispensers and the one or more incentives;
   receiving, from the user device and by the processor, a selection of a currency dispenser among the one or more currency dispensers to perform the interaction;
   displaying, on the user device, a map that identifies the currency dispenser based on the selection; and
   displaying an image, on the user device, of the currency dispenser based on the selection.

2. The method of claim 1, the method further comprising:
   receiving, by the processor, an indication of an expected travel route for a user associated with the user device,
   wherein the step of identifying the one or more currency dispensers is based at least in part on the expected travel route of the user.

3. The method of claim 1, wherein the step of sending comprises:

wherein the one or more currency dispensers is color-coded in the map, and wherein the color-coding relates to a condition of the currency dispenser.

4. The method of claim 3, wherein each of the one or more currency dispensers in the map is color-coded, and wherein the color-coding relates to the one or more conditions of the one or more currency dispensers.

5. The method of claim 3, wherein the map is displayed on a routing service application specified by the user device.

6. The method of claim 3, wherein the one or more currency dispensers identified in the map is represented by a customized icon, the customized icon indicative of a value of the one or more currency dispensers to a user associated with the user device.

7. The method of claim 6, wherein the value of the one or more currency dispensers to the user device relates to a proximity of the one or more currency dispensers to the user device.

8. The method of claim 6, wherein the value of the one or more currency dispensers to the user relates to a magnitude of an incentive offered to the user for using the one or more currency dispensers.

9. The method of claim 1, wherein the step of displaying a map on the user device comprises displaying a path to the currency dispenser.

10. The method of claim 9, wherein the step of displaying a map on the user device comprises displaying a three-dimensional map on the user device.

11. The method of claim 1, the method further comprising:
communicating, by the processor, directions to the user device to get to the currency dispenser.

12. The method of claim 1,
wherein the image of the currency dispenser comprises a viewing angle that is determined to be similar to an expected viewing angle that a user associated with the user device will approach the currency dispenser from, and
wherein the image of the currency dispenser is modified to indicate an incentive.

13. The method of claim 1, the method further comprising:
receiving, by the processor, an indication of an expected travel route for a user associated with the user device,
wherein the step of generating the incentive is based at least in part on the expected travel route of the user.

14. The method of claim 1, wherein the request for an interaction is generated based on an event that is indicated in a calendar utilized by a user associated with the user device.

15. The method of claim 1, wherein the selected currency dispenser includes a current amount of currency, the method further comprising:
calculating, by the processor, an expected adjusted amount of currency, for the selected currency dispenser, that is based on at least the current amount and the interaction with the user device.

16. The method of claim 15, the method further comprising:
the selected currency dispenser sending an indication that the selected currency dispenser has the expected adjusted amount even while the selected currency dispenser still has the current amount.

17. The method of claim 1, the method further comprising:
receiving, by the processor, authentication from the user device.

18. The method of claim 17, wherein the authentication comprises receiving information from the user device, the information relating to an image on the currency dispenser.

19. The method of claim 18, wherein the image is static.

20. The method of claim 18, wherein the image is a QR code.

21. The method of claim 18, wherein the image is dynamic.

22. The method of claim 21, wherein the image is a QR code.

23. The method of claim 1, wherein the request for the interaction with the currency dispenser comprises a request to pick up a specified amount of currency at a specified time.

24. The method of claim 1, wherein:
the one or more currency dispensers comprises a first currency dispenser and a second currency dispenser;
the one or more conditions of the one or more currency dispensers comprises the user device being in the process of executing a transaction with the first currency dispenser; and
the interaction with the one or more currency dispensers comprises an interaction with the second dispenser.

25. The method of claim 1, wherein the one or more currency dispensers is identified based at least in part on a desirable time period for a user associated with the user device to perform the interaction, wherein the desirable time period is based at least in part on at least one of a historic wait time associated with the one or more currency dispensers, a measured wait time associated with the one or more currency dispensers, an estimated currency availability of the one or more currency dispensers, and a temporal proximity to a life event of the user.

26. The method of claim 1, wherein the one or more conditions of the one or more currency dispensers comprises the one or more currency dispensers being associated with an event, the event historically affecting availability of currency in the at least one currency dispenser.

27. A non-transitory computer-readable medium having instructions stored thereon executed by a processor to:
receive, from a user device, a request for an interaction with a currency dispenser;
receive an indication of an expected travel route for a user associated with the user device;
identify at least one currency dispenser, among a plurality of currency dispensers, to perform the interaction, wherein the step of identifying the at least one currency dispenser is based at least in part on the expected travel route of the user;
send, to the user device, information that identifies the at least one currency dispenser;
display, via the user device, a map that identifies the at least one currency dispenser, wherein the at least one currency dispenser is color-coded in the map, and wherein the color-coding relates to a condition of the currency dispenser; and
receive, from the user device, a selection of a currency dispenser of the at least one currency dispenser.

28. The medium of claim 27, wherein the selected currency dispenser includes a current amount of currency, the instructions further executed by the processor to:
calculate an expected adjusted amount of currency, for the selected currency dispenser, that is based on at least the current amount and the interaction with the user device,
wherein the condition of the selected currency dispenser is at least partially based on the expected adjusted amount of currency of the selected currency dispenser.

29. A network-based method of utilizing a currency-management system that comprises a plurality of currency dispensers, the method performed using a processor executing instructions stored on a non-transitory computer-readable medium, the method comprising:
- receiving, from a user device and by the processor, a request for an interaction with a currency dispenser, wherein the request for an interaction is generated based on an event that is indicated in a calendar utilized by the user device;
- receiving, by the processor, an indication of an expected travel route for a user associated with the user device;
- identifying, by the processor, at least one currency dispenser, of the plurality of currency dispensers, to perform the interaction, wherein the identification is based at least in part on the expected travel route of the user;
- sending, to the user device and by the processor, information that identifies the at least one currency dispenser;
- receiving, from the user device and by the processor, a selection of a currency dispenser from the at least one currency dispenser; and
- displaying, using the user device, a map that identifies the at least one currency dispenser, wherein the at least one currency dispenser is color-coded in the map, and wherein the color-coding relates to a condition of the currency dispenser.

* * * * *